United States Patent [19]

Misumi et al.

[11] Patent Number: 5,055,938

[45] Date of Patent: Oct. 8, 1991

[54] REPRODUCTION APPARATUS FOR REPRODUCING SUCCESSIVE IMAGE SIGNALS OF DIFFERENT FREQUENCY BANDS

[75] Inventors: Hiroyoshi Misumi, Yokohama; Kunio Tsuruno, Tokyo, both of Japan

[73] Assignee: Canon Kabushiki Kaisha, Tokyo, Japan

[21] Appl. No.: 369,198

[22] Filed: Jun. 21, 1989

[30] Foreign Application Priority Data

Jun. 29, 1988 [JP] Japan .................................. 63-163104
Jun. 29, 1988 [JP] Japan .................................. 63-163105
Jun. 29, 1988 [JP] Japan .................................. 63-163113

[51] Int. Cl.$^5$ ............................................. H04N 5/76
[52] U.S. Cl. .................................... 358/340; 358/327;
     358/341; 358/343; 360/33.1; 360/19.1; 360/25
[58] Field of Search ............... 358/327, 334, 325, 322,
     358/337, 338, 341, 342, 340, 343; 360/73.01,
     73.03, 35.1, 36.1, 25, 19.1, 33.1, 25

[56] References Cited

U.S. PATENT DOCUMENTS

| | | | |
|---|---|---|---|
| 4,774,595 | 9/1988 | Miyake | 360/73.03 |
| 4,779,143 | 10/1988 | Oku et al. | 358/334 |
| 4,825,137 | 4/1987 | Nakajima | 360/73.03 |
| 4,868,679 | 9/1989 | Kanamaru | 358/334 |
| 4,884,150 | 11/1989 | Kanda | 358/327 |

Primary Examiner—Robert L. Richardson
Attorney, Agent, or Firm—Fitzpatrick, Cella, Harper & Scinto

[57] ABSTRACT

A reproduction apparatus provided with a reproduction head for reproducing information modulated in different frequency bands and recorded in different areas of a medium includes; a circuit for demodulating the output of the reproduction head with a characteristic corresponding to the frequency bands, a changing device for changing the track to be reproduced by the reproduction head, and control means for not varying the characteristic of the demodulating circuit during the changing operation.

24 Claims, 6 Drawing Sheets

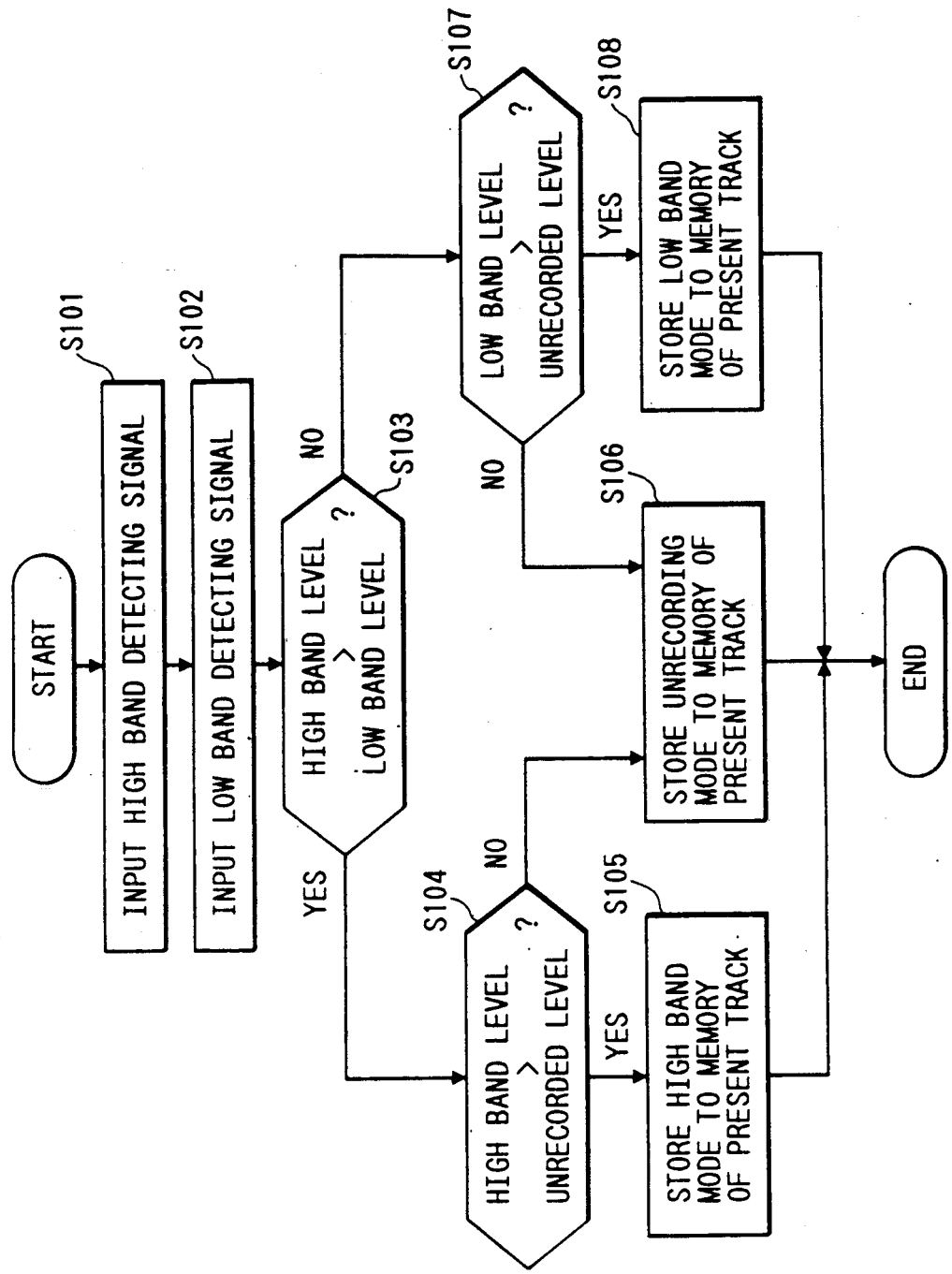

REPRODUCTION APPARATUS FOR REPRODUCING SUCCESSIVE IMAGE SIGNALS OF DIFFERENT FREQUENCY BANDS

BACKGROUND OF THE INVENTION

1. Field of the Invention

The present invention relates to a reproduction apparatus.

2. Related Background Art

As an example of such reproduction apparatus, there is already known an image reproduction apparatus capable of reproducing image signals of plural recorded frequency bands, such as a video tape recorder, and, in the reproduction of image signals in such apparatus, it is already known to discriminate the recorded frequency band and to effect a process matching the recording mode thereby reproducing the image. Conventionally said discrimination of the recording mode is conducted whenever the recording area of the recording medium is changed.

However, in such apparatus in which the frequency band of the image signal recorded in the recording area is discriminated at every change of the recording area and the characteristic of the demodulator is matched to the carrier frequency, an unstable output is generated at the change of the characteristic of the demodulator, thus causing perturbation in the image of a monitor unit for reproducing said image signal as a visible image, for example by inducing an error in the function of the synchronization separating circuit of the monitor unit.

An increased rate of said changes reduces the interval of image distortions, so that the image distortion on the monitor becomes more marked and unacceptable.

Also in the above-explained conventional apparatus in which the discrimination of the recording mode is conducted at every change of the recording area, there is required a certain time for said discrimination, and, in case of a mode change, the signal is processed with another mode until such change actually takes place, so that the quality of the output image becomes deteriorated. Also in case the recording mode is displayed, the switching of such display is inevitably delayed.

SUMMARY OF THE INVENTION

An object of the present invention is to solve the above-mentioned drawbacks totally or individually.

Another object of the present invention is to provide a reproduction apparatus capable of satisfactory reproduction without discrimination of the frequency band of the image recorded in the recording area at every change of the recording area.

Still another object of the present invention is to provide a reproduction apparatus capable of satisfactory reproduction from a recording medium on which plural image signals of different bands are mixedly recorded.

In a preferred embodiment of the present invention, the foregoing objects can be attained by a reproduction apparatus provided with means for reproducing information recorded in different areas of a medium with different bands; means for processing the output of said reproduction means with a characteristic corresponding to the band; varying means for continuously varying the area of reproduction by said reproduction means; and means for controlling the apparatus so as not to vary the characteristic of said process means during the variation by said varying means.

Still other objects of the present invention, and the advantages thereof, will become fully apparent from the following description of the embodiments, which is to be taken in conjunction with the attached drawings.

BRIEF DESCRIPTION OF THE DRAWINGS

FIGS. 6 and 7 are a block diagram and a flow chart when the function of a discrimination circuit 11 shown in FIG. 1 is provided in the controller 12.

DESCRIPTION OF THE PREFERRED EMBODIMENTS

In the following embodiment of the present invention there is disclosed a still video system in which concentric tracks are formed on a magnetic disk called a video floppy disk and the image signal of an image frame is recorded on each track, but the present invention is not limited to such apparatus. The present invention is applicable also to an apparatus for reproducing the image signal recorded in an optical disk, a tape-shaped medium or a semiconductor memory, or an apparatus for reproducing information other than the image signal, recorded in a medium.

Now, the present invention will be clarified in detail by embodiments thereof shown in the attached drawings.

In the following embodiment, there is disclosed an apparatus for reproduction from a disk, in which mixedly present are a high-band recording with a high frequency of the FM carrier for image recording in order to improve the horizontal resolution of the image recorded on the recording medium, and a low-band recording with an FM carrier frequency of 6–7.5 MHz defined in the format of the still video system.

Figure 3:
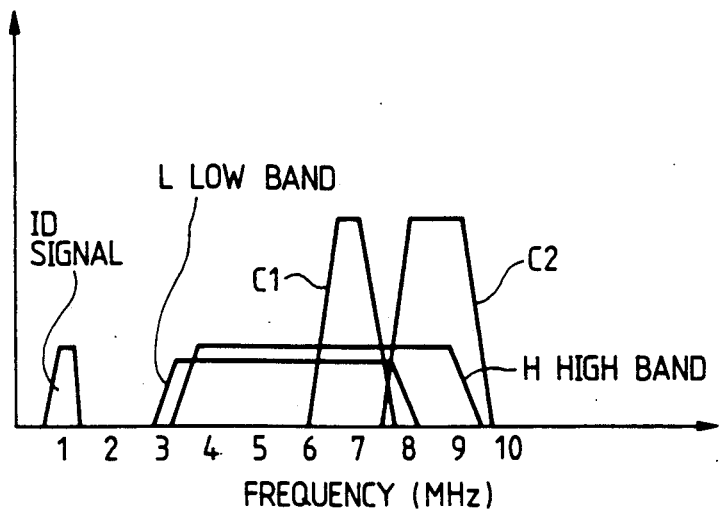
FIG. 3 is a chart showing the frequency bands of a high-band recording and a low-band recording, and the frequency characteristic of a filter 10 shown in FIG. 1.

The frequency bands of said high-band recording and low-band recording are shown in FIG. 3.

In the following there will be explained the structure of a reproduction apparatus embodying the present invention, with reference to FIG. 1, which is a block diagram of an embodiment.

Figure 1:
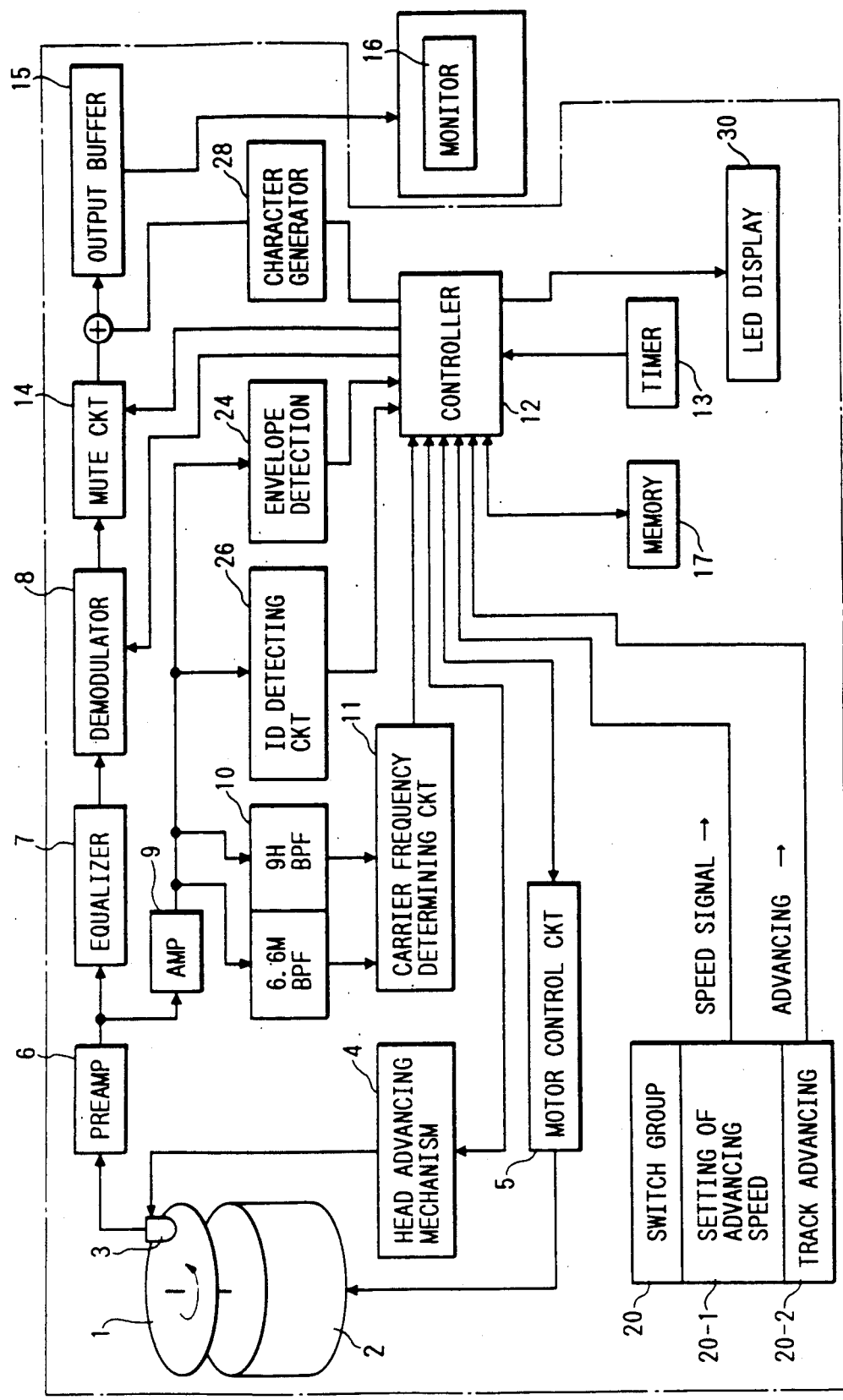
FIG. 1 is a block diagram of an embodiment of the reproduction apparatus of the present invention.

In FIG. 1 there are shown a magnetic sheet 1 rotated at a constant speed by a spindle motor 2; a magnetic head 3 providing access to a desired track position using a head advancing mechanism 4 controlled by a controller 12; and a motor control circuit 5 for controlling the spindle motor 2. With reference to the flow of the image signal, a pre-amplifier 6 amplifies the image signal detected by the magnetic head 3. Then the image signal branches to a carrier detecting circuit and to a circuit for image reproduction. There are provided an equalizer 7 and a demodulator 8 in the image reproduction circuit. In the present embodiment, the reproducing carrier for the demodulator is varied for high-band demodulation or for low-band demodulation by the controller 12. The image signal is demodulator by the demodulated 8, and is released as an image reproduction signal through an output buffer 15.

A muting circuit 14 normally transmits the output signal of the demodulator 8 to the output buffer 15.

For carrier detection, the output signal of the preamplifier 6 is amplified by an amplifier 9 and is supplied to a band-pass filter 10. In the present embodiment there are provided plural band-pass filters, and the carrier frequency is discriminated by the comparison of outputs of the band-pass filters of different passing bands. If the central frequencies of the passing bands are respectively selected at 6.6 MHz and 9 MHz as shown by C1, C2 in FIG. 3, the output of the band-pass filter of 9 MHz becomes larger than that of the band-pass filter of 6.6 MHz in the reproduction of a high-band recorded image signal, in which the frequency of the carrier is close to 9 MHz.

A carrier frequency determining circuit 11 compares the outputs of the band-pass filters, and informs the controller 12 whether the image signal to be reproduced is recorded in the high band or low band.

The controller 12 stores the carrier frequency of each track in a memory 17, and, when an access is made again to said track, mutes the output of the demodulator 8 by means of the muting circuit 14, for a predetermined time determined by a timer 13. A monitor 16 for reproducing the output signal of the output buffer 15 is connected as a unit to the apparatus of the present embodiment.

The above-mentioned memory 17 records, for each track, the presence or absence of a recording therein, the result of the discrimination whether the recorded signal is an image signal or otherwise, and, in the case of a image signal, whether it is recorded in the high band or low band.

A switch group 20 for sending various instructions to the controller 12 includes a track advance speed varying switch 20-1 and a track up/down advance switch 20-2 to be explained later.

An envelope detection circuit 24 is provided for the output of the amplifier 9, and the controller 12 discriminates the presence or absence of a recording in the track being accessed, by the output of said circuit 24. An ID detecting circuit 26 detects and demodulates the component of a predetermined frequency band in the output of the amplifier 9, and releases an ID signal recorded together with the image signal. Said ID signal is not released when an audio signal is recorded.

Consequently, if the envelope detecting circuit 24 releases an output, but the ID detecting circuit 26 does not release the output, the controller 12 determines that the signal recorded on a track on which the head 3 is positioned is a non-image signal, namely an audio signal.

There is also provided a character generator 28 for displaying characters, controlled by the controller 12, on the monitor 16 through the output buffer 15.

LED's 30 display the state of the apparatus and include an LED for indicating that the image signal recorded on a track on which the head 3 is positioned represents a high-band recorded image.

In the present embodiment, the same magnetic sheet may contain image signals of different carrier frequencies. If the images of different carrier frequencies recorded on said magnetic sheet 1 are reproduced in succession, the demodulated signal voltage of the demodulator 8 generates a voltage shift corresponding to the difference in the carrier frequency, and the transient response of said voltage variation induces an unstable state in the succeeding signal processing circuit, for example in the synchronization separating circuit for the monitor 16. Thus a distortion is generated in the image reproduced on the monitor 16, thus giving unpleasant feeling to the user.

In the present embodiment, for avoiding the above-mentioned drawback, the recorded carrier frequency is identified by the carrier frequency determining circuit, and is stored in the memory through the controller 12. The reproduced image signal is muted for a period of 0.1–0.9 sec. required for the stabilization of the signal voltage only when a low-band recorded track, a high-band recorded track and a low-band recorded track are reproduced in succession.

Besides, in the present embodiment, the advancing speed of the head 3 is detected, and, if it is a low speed, the discrimination of the carrier frequency of the signal reproduced by the head 3 is conducted at every movement of the head 3, thereby releasing the appropriate image signal. On the other hand, when the head advancing speed is high, the characteristic of the demodulator 8 is maintained constant, in order to prevent the disturbance in the reproduced image, caused by the erroneous function of the synchronization separating circuit for the monitor 16, resulting from unstability in the image signal.

The constantly maintained characteristic of the demodulator induces a variation in the output level of the demodulator 8, thus causing fluctuation in the luminance of the image reproduced on the monitor 16, but this is not conspicuous because the track advancing speed is high.

In the following there will be explained the function of the above-explained embodiment, with reference to flow charts shown in FIGS. 2, 4 and 5.

The control sequence is started by the supply of power to the apparatus of the present embodiment by means of an unrepresented power switch, and the head advancing mechanism 4 is activated to advance the head 3 to the outermost first track on the magnetic sheet 1 (step S10). Then the track advancing speed, to be explained later, is set at 2 tracks/sec., and the characteristic of the demodulator 8 is set for the high-band demodulation (step S12). Said setting may be made for the low-band demodulation. Then it is determined whether the change in the track advancing speed has been commanded by the switch 20-1 (step S14). In the present embodiment, there can be selected a track advancing speed of 2, 5 or 10 tracks/sec. while the up/down switch 20-2 is turned on, or 0 track, namely the advancement of the head 3 by a track after the turning-on of the switch 20-2 until said switch is turned off and turned on again. In response to every turning-on of the switch 20-1 in a step S14, the controller 12 cyclically varies the track advancing speed in the order of 2 tracks/sec., 5 tracks/sec., 10 tracks/sec. and 0 track/sec. (step S16).

Also in the step S16, the controller 12 activates the character generator 28 to display the selected track advancing speed on the monitor 16, whereby the operator can know the selected track advancing speed. Said display can be achieved with a simple structure, without particular display devices, by superimposing display together with the image signal reproduced on the monitor 16. If the step S14 identifies the absence of a instruction for the change of track advancing speed by the switch 20-1, the sequence proceeds to a step S18 for discriminating whether the up/down switch 20-2 has been turned on.

If said switch 20-2 has not been turned on, a step S20 detects the outputs of the detection circuit 24, causes ID detecting circuit 26 and determining circuit 11 to discriminate whether the track on which the head 3 is positioned is already recorded or not, then, if already recorded, whether it is an image signal, and, if it is an image signal, whether the recording mode is high-band recording or low-band recording. If the presence of an image signal is identified, the characteristic of the demodulator 8 is changed according to the high-band or low-band recording, and said characteristic is displayed by the LED 30 (step S22). Also the result of detection or discrimination in the step S20 is stored in an area of the memory 17, corresponding to the track currently reproduced by the head 3 (step S24). Thereafter the sequence returns to the step S14. On the other hand, if the step S18 determines that the up/down switch 20-2 has been turned on, a step S28 discriminates whether the set track advancing speed is 0 track/sec. or not, and the sequence proceeds respectively to a flow (A) in FIG. 4 or a flow (B) in FIG. 5.

In the following there will be explained the control sequence shown in FIG. 4.

Figure 4:
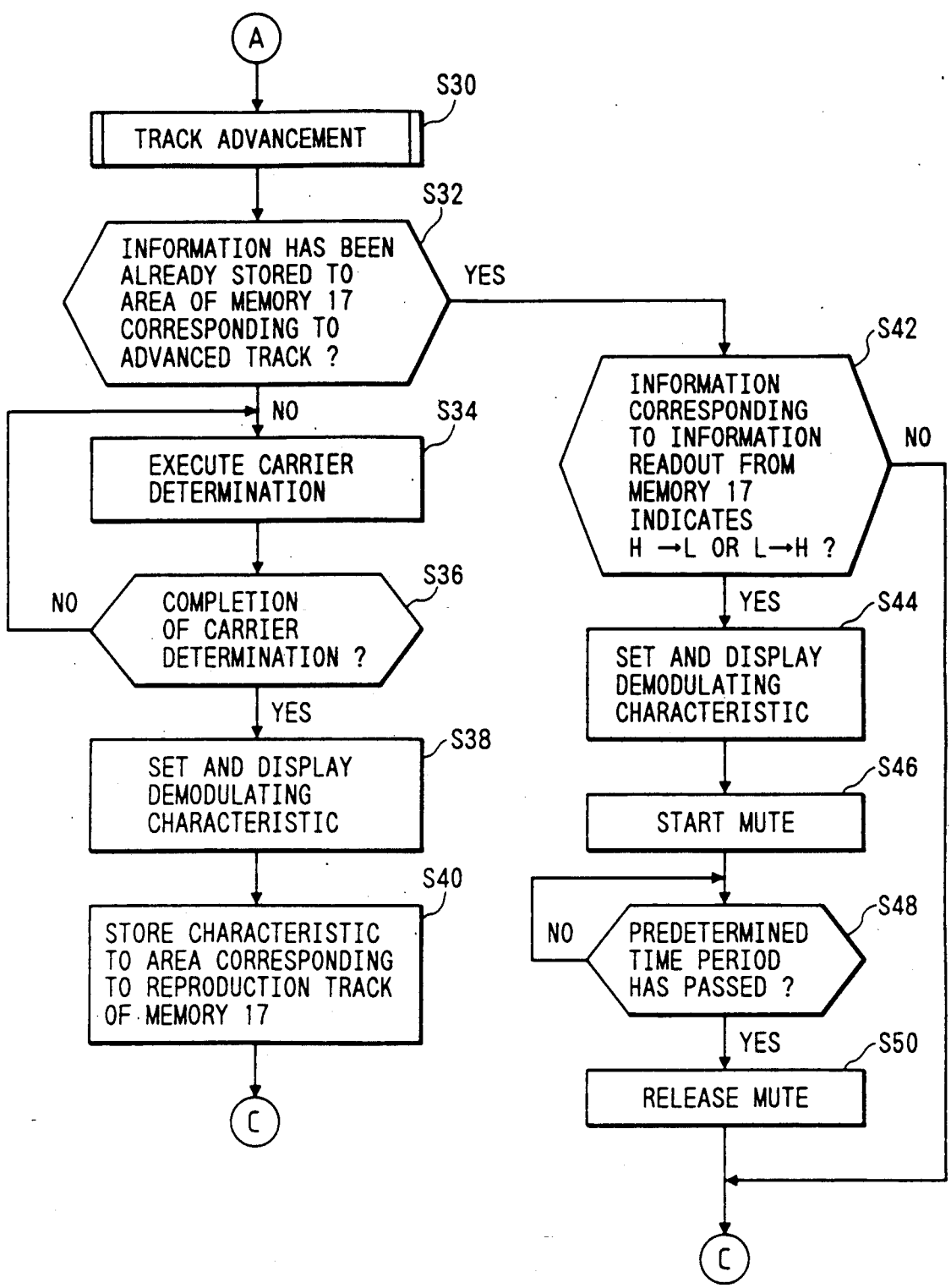

A step S30 in FIG. 4 moves the head 3 by a track, and discriminates whether information is already written in an area of the memory 17 corresponding to the track to which the head 3 has been moved, and the sequence proceeds to a step S42 or S43 respectively if the information is already written or not. The step S34 is similar to the step S20 shown in FIG. 2. After a discrimination in a step S36, the sequence proceeds to steps S38 and S40 which are similar to the steps S22, S24, and the sequence returns to a flow (C) in FIG. 2.

In the following, a case is explained in which the sequence proceeds from the step S32 to S42. The step S42 reads the information stored in an area of the memory 17 corresponding to the new track to which the head 3 has moved, and compares said information with that of the track on which the head 3 was positioned prior to the execution of the step S30. If both information are different, for example if either indicates the high-band recording while the other indicates the low-band recording, the sequence proceeds to a step S44. On the other hand, if both information mutually coincide, the sequence proceeds to the flow (C) in FIG. 2.

The step S44, similar to the step S22, varies the characteristic of the demodulator 8. Since the response of said demodulator 8 is not so high and causes distortion of the image on the monitor, a step S46 activates the muting circuit 14 shown in FIG. 1, thereby muting the monitor 16. After the lapse of a time in consideration of the response of the demodulator 8, the sequence proceeds to a step S50 to terminate the muting, and the sequence proceeds to the point (C) in FIG. 2.

In the following there will be explained the control sequence when the sequence branches from the step S28 in FIG. 2 to (B), with reference to FIG. 5.

Figure 5:
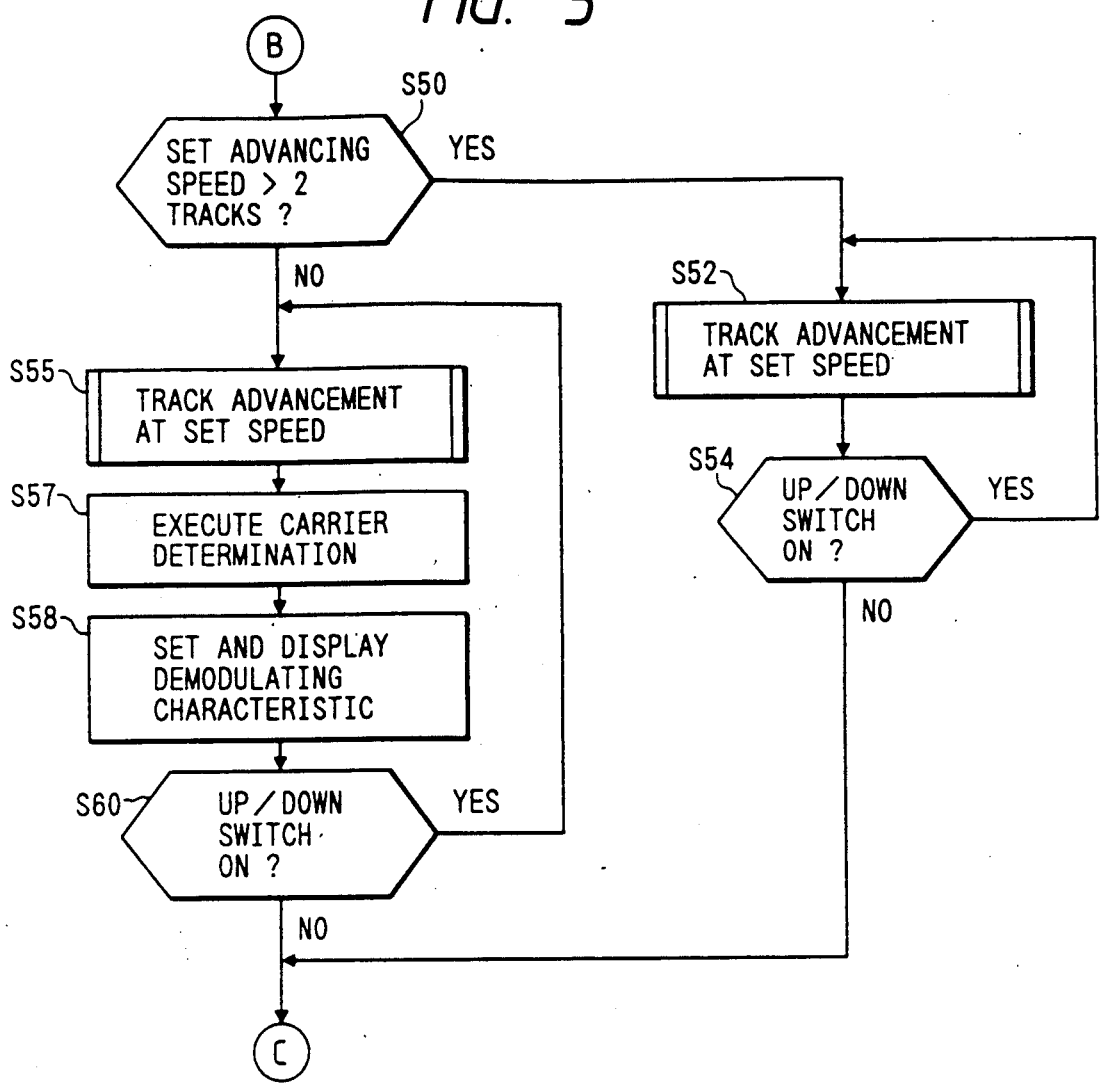

The control sequence shown in FIG. 5 varies the characteristic of the demodulator 8 if the track advancing speed is set at 2 tracks/sec. but does not execute said variation when said speed exceeds 2 tracks/sec.

The discriminating function of the controller 12 will be explained in the following, with reference to the flow chart shown in FIG. 5 for automatic advancing mode.

At first a step S50 discriminates whether the set track advancing speed exceeds 2 tracks/sec. If said speed exceeds 2 tracks/sec., the sequence proceeds to a step S52 for moving the head 3 by a track without carrier determination. In this operation the head 3 is moved inwards or outwards on the magnetic sheet 1, according to the state of the up/down switch 20-2. On the other hand, if the speed does not exceed 2 tracks/sec., a step S55 moves the head at the set advancing speed in a direction designated by the up/down switch 20-2. Subsequently executed steps S57, S58 are similar to the steps S20, S22. Thus, if the track advancing speed is 2 tracks/sec., the recording state of the track is discriminated at every advancement of the head 3 to a new track, and the demodulating characteristic of the demodulator 8 is varied accordingly. A succeeding step S60 discriminates whether the up/down switch 20-2 has been turned on, and, if turned on, the sequence returns to the step S55.

After the aforementioned step S52, a step S54 is executed for discriminating whether the up/down switch 20-2 has been turned on, and, if turned on, the step S52 is executed again.

Consequently, in the present embodiment, if the track advancing speed is equal to 5 tracks/sec. or higher, the steps S52 and S54 are executed, and the steps S55, S57 and S58 are not executed as in the case of an advancing speed of 2 tracks/sec.

Thus the disturbance of the image reproduced on the monitor 16 is prevented, by not varying the characteristic of the demodulator 8 if the head is moved from one track to another within a time shorter than the response time of the demodulator 8 when the characteristic thereof is varied.

In the sequence shown in FIG. 5, the step S50 is followed by the steps S55, S57 and S58, but it is also possible, after the execution of the steps S32, S34, S36, S38, S40, S42, S44, S46c, S48 and S50, to proceed to the step S60 instead of returning to the point (C).

In the foregoing embodiment the high-band or low-band recording is discriminated by the determining circuit 11, but said discrimination may also be conducted by the controller 12.

Figure 6:
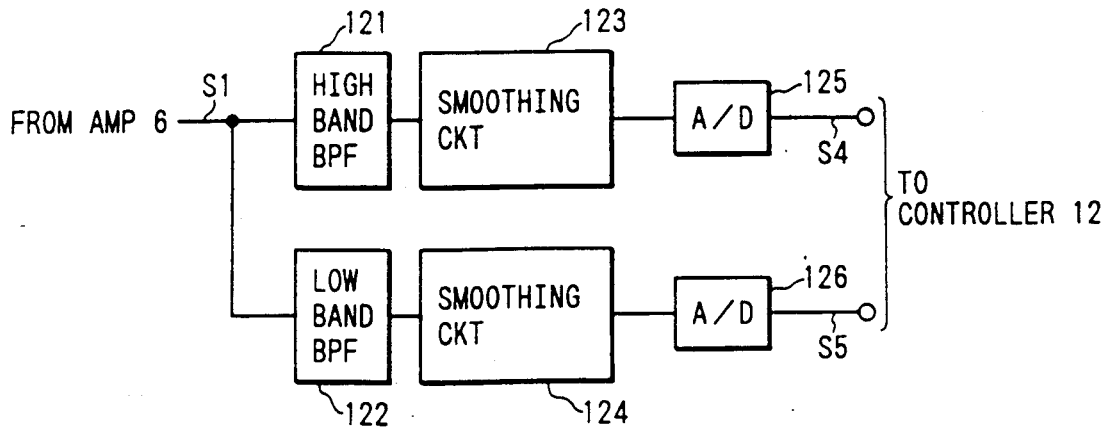

Now reference is made to FIGS. 6 and 7 for explaining such an embodiment.

FIG. 6 is a block diagram, replacing the circuits 10, 11 shown in FIG. 1, for discriminating the high-band or low-band recording by the controller 12. In FIG. 6 there are shown a high band pass filter 121, a low band pass filter 122, smoothing circuits 123, 124, and A/D converters 125, 126. A reproduced RF signal SI from the amplifier 6 is supplied to said high band pass filter and low band pass filter. As those shown in FIG. 3, the low band pass filter is so constructed as to obtain the signals of 6–7.5 MHz (C1), while the high band pass filter is so constructed as to obtain the signals of 7.7–10 MHz (C2). The signals transmitted by the band pass filters are smoothed, then A/D converted and supplied to the controller 12. Since the reproduced signal is either in the high-band recording or in the low-band recording, either one of the signals S4, S5 from the envelope detection circuit always has a higher level.

The signals S4, S5 supplied to the controller 12 are processed according to a flow chart shown in FIG. 7. Said signals S4, S5 are fetched in succession (steps S101, S102) and compared (step S103). Subsequently they are compared with an unrecorded level set in the controller 12 (steps S104, S107), and, if higher than said level, the result of comparison in the step S103 is stored in the memory 6 (step S105). If smaller than said level, the track is identified as being unrecorded, and the information of the unrecorded track is stored in the memory 6.

Thus the controller 12 can identify the presence or absence of recording on the track on which the head 3 is positioned, and the presence of an image signal in the high-band or low-band recording. This structure allows the envelope detection circuit 24 to be eliminated.

Figure 8:
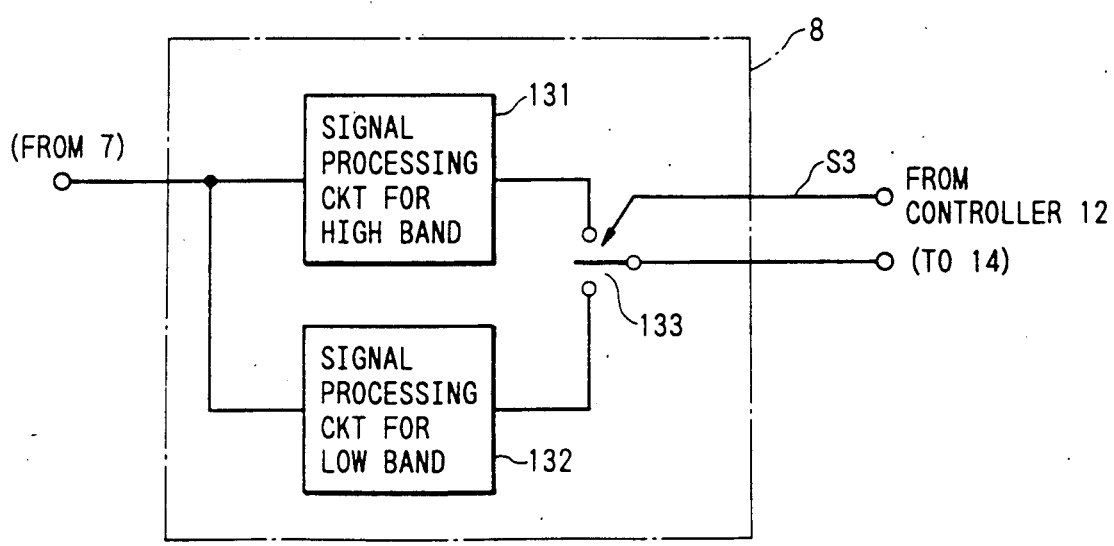
FIG. 8 is a block diagram of a variation of a demodulator 8.

In the foregoing embodiments, the characteristic of the demodulator 8 is varied by a change in the demodulating carrier frequency supplied thereto, but the demodulator 8 may be of a structure as shown in FIG. 8, in which shown are a high-band signal processing circuit 131, a low-band signal processing circuit 132, and a selector switch 133. In response to a mode signal S3, indicating the identified recording mode, from the controller 12, the image signals processed in respective modes are selected and supplied to the muting circuit 14.

Also in the foregoing embodiments, the information on the recording mode is stored in the memory on the tracks already scanned by the head 3, so that such discrimination need not be repeated again when the head 3 is placed again on the same track. Consequently there is provided a smoother image display and mode display.

Figure 2:
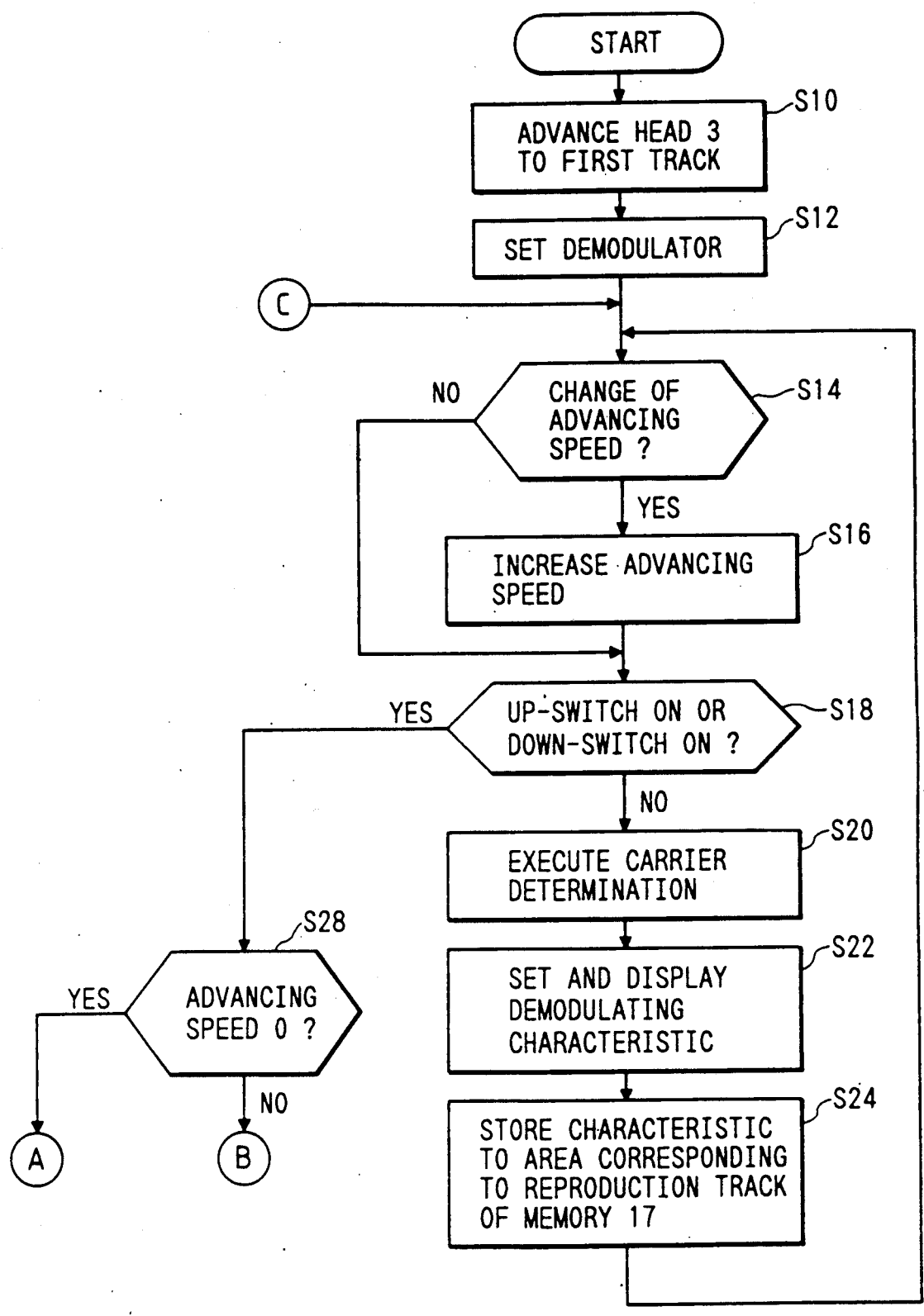
FIGS. 2, 4 and 5 are flow charts showing the functions of a controller 12 shown in FIG. 1.

Also in the foregoing embodiments, the discrimination of low-band or high-band recording is conducted on the tracks on which the head 3 is positioned, but it is also possible to position the head in succession on all the tracks on the magnetic sheet 1 between the steps S12 and S14 in FIG. 2, and to record the results prior to the start of reproduction. During said successive accesses, the monitor 16 can be muted by the muting circuit 14.

Thus the foregoing embodiments enable image reproduction without disturbance, thereby avoiding an unpleasant feeling in the operator, even when image signals modulated with different carrier frequencies are recorded in different frequency bands on a same magnetic sheet.

The above-explained embodiments enable stable reproduction by maintaining constant the characteristic of the signal process means while the areas reproduced by the reproducing means are changed in succession.

Also the above-explained embodiments enable the perturbation in the output, appearing at the switching of the characteristic of said process means to be avoided, thereby providing satisfactorily stable reproduction.

Furthermore the above-explained embodiments provide a reproduction apparatus with satisfactory response, since the discrimination of the recording mode need not be conducted at every change of the recording area to be reproduced, so that the time required for such discrimination can be reduced.

What is claimed is:

1. A reproduction apparatus comprising:
   (a) reproduction means for reproducing information recorded in recording blocks on a medium, the recording blocks containing information recorded in different frequency bands, respectively;
   (b) process means for processing the output of said reproduction means with a reproduction characteristic corresponding to the frequency band, the reproduction characteristic being different for information from different frequency bands;
   (c) changing means for sequentially changing the recording block being reproduced by said reproduction means; and
   (d) control means for controlling said process means so as not to change the reproduction characteristic of said process means during the changing operation performed by said changing means in order to reduce distortions during the changing operation.

2. An apparatus according to claim 1, wherein the medium comprises a disk.

3. An apparatus according to claim 2, wherein said reproduction means comprises a reproduction head movable in a radial direction of the disk medium.

4. An apparatus according to claim 1, wherein said information comprises an image signal.

5. An apparatus according to claim 3, wherein said changing means comprises drive means for moving said reproduction head.

6. An apparatus according to claim 3, wherein said changing means moves said reproduction head in the radial direction of the disk medium at a speed selected from among plural speeds.

7. An apparatus according to claim 6, wherein said control means controls said process means so as not to vary the characteristic of said process means during a changing of the selected speed.

8. A reproduction apparatus comprising:
   (a) means for reproducing information recorded in different frequency bands in different areas of a medium;
   (b) means for processing the reproduced signal from said reproducing means, with a characteristic corresponding to said frequency band; and
   (c) means for reducing distortion in an output of said process means generated at the switching of the characteristic thereof.

9. An apparatus according to claim 8, wherein said reducing means mutes the distortion of the process means output generated at said switching.

10. An apparatus according to claim 6, further comprising discrimination means for discriminating the frequency bands of the recorded information based on the output of said reproduction means.

11. An apparatus according to claim 10, wherein said process means processes the reproduced signal from said reproduction means with a characteristic corresponding to the frequency band discriminated by said discrimination means.

12. An apparatus according to claim 8, wherein the medium comprises a disk.

13. An apparatus according to claim 12, wherein said reproduction means comprises a reproduction head movable in the radial direction of the disk medium.

14. An apparatus according to claim 8, wherein said information comprises an image signal.

15. An apparatus according to claim 13, further comprising changing means for moving said reproduction head in the radial direction of the disk medium at a speed selected from among plural speeds.

16. A reproduction apparatus for reproducing image signals modulated in different frequency bands and recorded in respective different areas of a medium, comprising:
   (a) a reproduction head for accessing the different recording areas and reproducing the image signals recorded therein;
   (b) process means for demodulating the image signals reproduced by said reproduction head, said process means demodulating image signals from the different frequency bands;
   (c) changing means for changing, in succession at a predetermined speed, the recording area of the medium accessed by said reproduction head; and (d) control means for maintaining the demodulation of said process means at a predetermined state, when said changing means causes said reproduction head to access different areas of the medium causing the process means to demodulate image signals from different frequency bands.

17. An apparatus according to claim 16, wherein said process means comprises a demodulating circuit for demodulating said image signals.

18. An apparatus according to claim 16, wherein said changing means comprises drive means for moving said reproduction head in a radial direction of a disk-shaped medium.

19. An apparatus according to claim 16, further comprising discrimination means for discriminating the frequency bands of the recorded image signals, based on the output of said reproduction head.

20. An apparatus according to claim 17, wherein said demodulating circuit comprises an FM demodulating circuit.

21. An apparatus according to claim 16, wherein said changing means changes the recording area to be accessed by said reproduction head in response to a manual operation.

22. A reproduction apparatus for reproducing information recorded in different frequency bands in respective different areas of a recording medium, comprising:
  (a) a discrimination means for discriminating the different frequency bands of the recorded information; and
  (b) a memory means for respectively storing, for plural areas of the recording medium, an indication of the frequency band of the information recorded in the corresponding area of the recording medium as determined by said discrimination means.

23. An apparatus according to claim 22, wherein said information includes audio information and image information, and wherein said discrimination means not only discriminates the frequency bands but also discriminates whether the recorded information is audio information or image information.

24. An apparatus according to claim 22, wherein said memory means stores, for each recording area, the result of the discrimination performed by said discrimination means.

* * * * *

UNITED STATES PATENT AND TRADEMARK OFFICE
CERTIFICATE OF CORRECTION

PATENT NO. : 5,055,938

DATED : October 8, 1991

INVENTOR(S) : HIROYOSHI MISUMI, ET AL.

It is certified that error appears in the above-identified patent and that said Letters Patent is hereby corrected as shown below:

On the Title page,
item [56] U.S. Patent Documents:

Line 3, "4,825,137　4/1987 Nakajima" should
　　　read --4,825,137　4/1989 Nakajima--.

On the Title page,
item [57] Abstract:

Line 4, "includes;" should read --includes:--.

COLUMN 2

Line 66, "demodulator" should read --demodulated--.
　　　Line 67, "demodulated 8," should read --demodulator 8,--.

COLUMN 3

Line 32, "a" should read --an--.

COLUMN 4

Line 64, "a" should read --an--.

COLUMN 5

Line 3, "determinating circuit 11" should read --determining circuit 11--.

UNITED STATES PATENT AND TRADEMARK OFFICE
CERTIFICATE OF CORRECTION

PATENT NO. : 5,055,938
DATED : October 8, 1991
INVENTOR(S) : HIROYOSHI MISUMI, ET AL.

It is certified that error appears in the above-identified patent and that said Letters Patent is hereby corrected as shown below:

COLUMN 6

Line 34, "S46c," should read --S46--.
    Line 66, "memory 6" should read --memory 17--.
    Line 68, "memory 6." should read --memory 17.--.

COLUMN 8

Line 34, "claim 6," should read --claim 8,--.
    Line 48, "the" (first occurrence) should read --a--.

Signed and Sealed this

Fifteenth Day of June, 1993

Attest:

MICHAEL K. KIRK

*Attesting Officer*      *Acting Commissioner of Patents and Trademarks*